Aug. 6, 1968            R. J. SHAEFFER            3,395,591

REMOTE CONTROL ASSEMBLY CONSTRUCTION

Filed July 8, 1965                                     2 Sheets-Sheet 1

INVENTOR.
Robert J. Shaeffer
BY
Barnard, McGlynn & Reising
ATTORNEYS

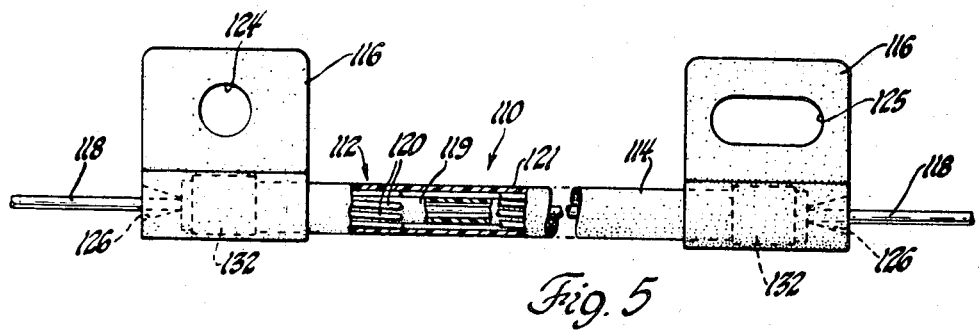
Fig. 5
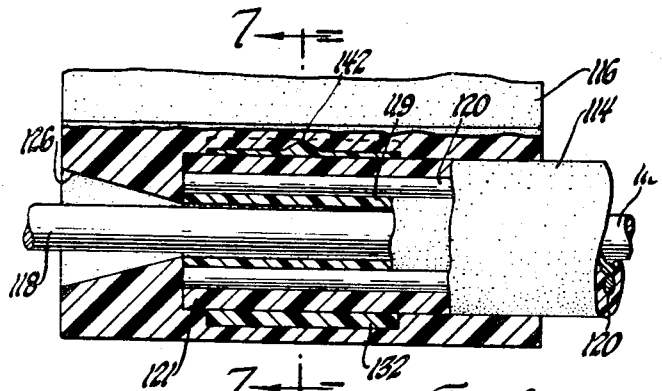
Fig. 6
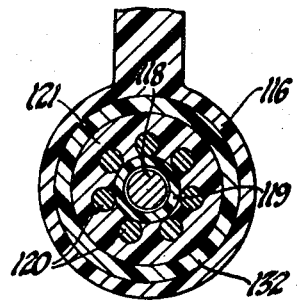
Fig. 7
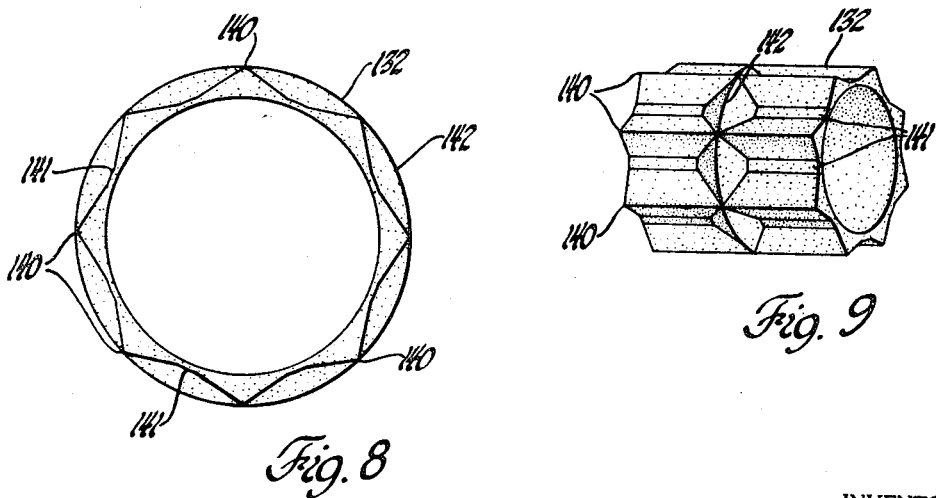
Fig. 8
Fig. 9
INVENTOR.
Robert J. Shaeffer
BY
Barnard, McGlynn & Reising
ATTORNEYS

United States Patent Office 3,395,591
Patented Aug. 6, 1968

3,395,591
REMOTE CONTROL ASSEMBLY CONSTRUCTION
Robert J. Shaeffer, Skippack, Pa., assignor to Teleflex Incorporated, North Wales, Pa., a corporation of Delaware
Continuation-in-part of application Ser. No. 455,489, May 13, 1965. This application July 8, 1965, Ser. No. 470,397
9 Claims. (Cl. 74—501)

ABSTRACT OF THE DISCLOSURE

A remote control assembly of the type having a guide comprising a flexible conduit and an end fitting for supporting a movable core element. A flexible conduit is mechanically connected to an end fitting, which is made of organic polymeric material incompatible for bonding to the conduit, by disposing a retaining means on the exterior of the conduit and molding the end fitting about the retaining means so as to form a mechanical interlock to prevent relative axial movement between the conduit and the end fitting.

---

This application is a continuation-in-part of application Ser. No. 455,489, filed May 13, 1965, in the name of Robert J. Shaeffer, now abandoned.

Remote control assemblies of the type to which the instant invention pertains are typically used in marine, aircraft and automotive installations. Such as assembly includes a guide for supporting a movable core element where the movable core element is used as a control member. For example, such assemblies are utilized in automobiles to control such things as vents and heaters. The guide is secured to the support structure of the automobile and the movable core element is moved within the guide to control the heater, vent, or the like. One guide typically used in such installations comprises a flexible conduit with an end fitting secured thereto such that a movable core element may be movably disposed within the end fitting and the conduit. The end fitting must engage and be secured to the conduit without applying excessive radial forces to the conduit so as to prevent relative axial movement between the conduit and the end fitting to prevent the conduit from being pulled from the end fitting.

Fittings which have been proposed for use with such conduits have been generally of two types. The first type is a fitting having surfaces which tightly engage or clamp the conduit and the second type is a fitting made of plastic, or the like, and bonded to a plastic casing of the conduit. The fittings which are secured to a conduit by tightly engaging the conduit are not satisfactory since, in order to prevent axial movement between the fitting and the conduit, the fittings apply excessive radial forces to the conduit which tend to deform the conduit to interfere with movement of the inner core element. The other type of fitting, which is bonded to the conduit, has not proved satisfactory in all situations since the material of which the fitting is made must be compatible for bonding to the material comprising the exterior of the conduit so that a chemical bond is formed between the fitting and the exterior of the conduit, It is desirable to make the exterior of the conduit of low-priced, low-strength materials such as polyethylene or polypropylene, yet most of the materials which are compatible for chemical bonding to such a conduit do not have the strength characteristics required of an end fitting in particular environments. End fittings must be made of a material having sufficient compression strength so that a bolt, screw, or the like, may be placed through a hole in the end fitting and tightened to secure the end fitting to a support structure without deforming the fitting. Higher priced and higher strength materials such as an acetal resin, Delrin or nylon possess sufficient strength characteristics for use in end fittings but are not compatible for bonding to the lower priced materials, such as polyethylene and polypropylene, which are preferably utilized for the exterior of the conduit.

Accordingly, it is an object and feature of this invention to provide a guide comprising a conduit connected to an end fitting and a method for making same whereby the exterior of the conduit may be made of a material incompatible for bonding to the material of which the end fitting is made, yet the end fitting may be secured to the conduit so as to prevent relative axial movement between the end fitting and the conduit without subjecting the conduit to excessive radial forces.

Another object and feature of the instant invention is to set forth the method of making a remote control assembly of the type for supporting a movable core element and having a flexible conduit secured to an end fitting made of material incompatible for bonding to the conduit, by bonding to the conduit a retaining tab made of material compatible for bonding to the exterior of the conduit and thereafter molding or forming a portion of the end fitting about the retaining tab so as to prevent relative axial movement between the end fitting and the conduit.

In general, these and other objects of this invention are attained by a remote control assembly including a flexible conduit with a retaining tab disposed on the flexible conduit so as to project therefrom, and an end fitting formed or molded about the retaining tab so that the flexible conduit may be secured to the end fitting even though the end fitting is made of material which is incompatible for bonding to the flexible conduit.

Other objects and attendant advantages of the present invention will be readily appreciated as the same becomes better understood by reference to the following detailed description when considered in connection with the accompanying drawings wherein:

FIGURE 5 is a side elevational view partially in cross section of another preferred embodiment of the instant invention;

FIGURE 6 is an enlarged fragmentary view partially in cross section of the embodiment shown in FIGURE 5;

FIGURE 7 is a fragmentary cross-sectional view taken substantially along line 8—8 of FIGURE 6;

FIGURE 8 is an enlarged end view of the retaining tab shown in FIGURES 5 through 7; and FIGURE 9 is an isometric view of the retaining tab shown in FIGURES 5 through 8.

Figure 1:
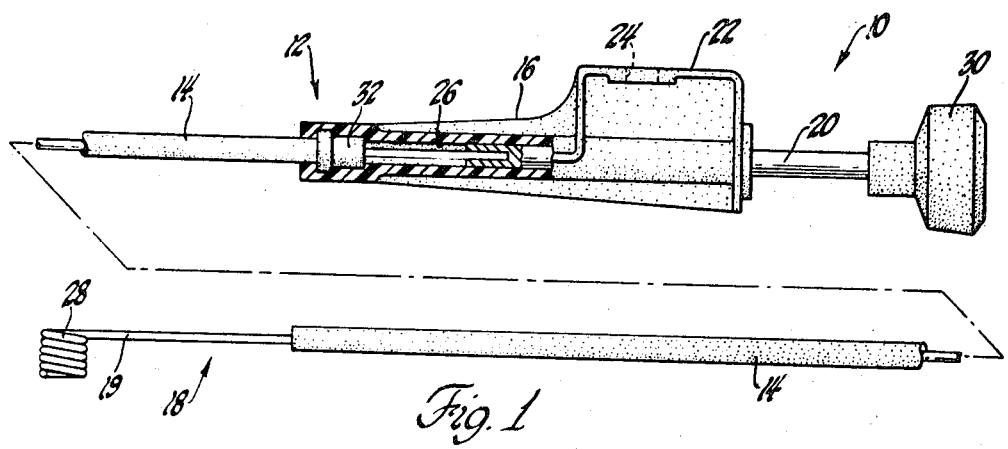
FIGURE 1 is a side elevational view partially in cross section of a preferred embodiment of the remote control assembly of the instant invention.

Referring now to the drawings, wherein like reference numerals indicate like or corresponding parts throughout the several views, there is shown, generally at 10 and 110, remote control assemblies each including a guide, shown generally at 12 and 112 respectively. The guide 12 comprises a flexible conduit 14 and an end fitting 16 for movably supporting the motion transmitting core element, shown generally at 18. The guide 112 also comprises a flexible conduit 114 and end fittings 116 for movably supporting a motion transmitting core element 118.

Figure 2:
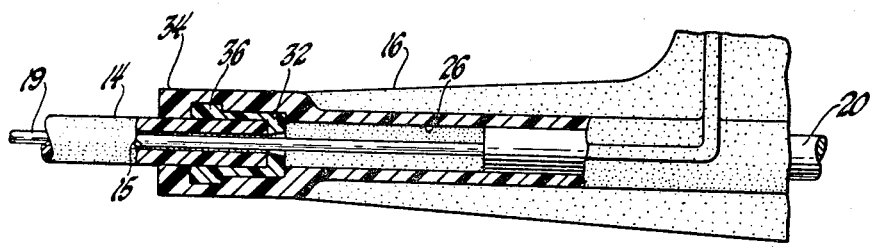
FIGURE 2 is an enlarged fragmentary view partially in cross section of the embodiment shown in FIGURE 1.
Figure 3:
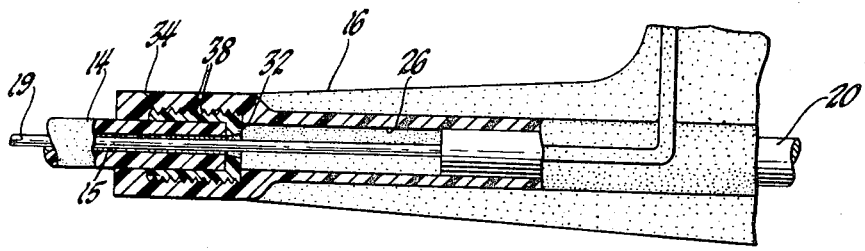
FIGURE 3 is an enlarged fragmentary view partly in cross section showing another preferred embodiment of the instant invention.

The invention as illustrated in FIGURES 1 through 3 will be described first. The flexible conduit 14 has a bore 15 therethrough and the conduit 14 is preferably made of polypropylene or polyethylene, although the conduit 114, which will be more fully described hereinafter, may be substituted for the conduit 14. The motion transmitting core element 18 includes a wire-like rod 19 and a bar 20.

The end fitting 16 is adapted to be attached to a support structure by the flat surface 22 and the holes 24 through which bolts, screws, or the like, may be inserted and attached to a support structure such as the instrument panel of an automobile. The end fitting 16 also has a bore 26 extending therethrough.

The motion transmitting core element 18 has a first end 28 which extends from the flexible conduit 14 and has a means comprising an eyelet for attachment to an element to be controlled, such as a vent in an automobile. The core element 18 extends at the other end within the end fitting 16 and includes the bar 20. The bar 20 is attached to the wire-like rod 19 of the core element 18 by swaging, welding, or the like.

A knob 30, or the like, is attached to the end of the bar 20 so that the core element 18 may be moved within the guide 12.

The end fitting 16 is made of a higher strength material than the material of the conduit 14 and is preferable made of an acetal resin, Delrin, or nylon. As alluded to previously, however, if the exterior of the conduit 14 is made of polypropylene or polyethylene, the fitting 16, when made of an acetal resin, Delrin, or nylon, cannot be bonded to the conduit 14 since the acetal resins, Delrin, or nylon are not compatible for bonding to the conduit 14.

In order to use the high strength materials for the end fitting 16 while using the low-strength, low-cost materials for the conduit 14, a retaining tab 32 made of material compatible for bonding to the material of the conduit 14 is bonded to the exterior of the conduit 14. Of course, the retaining tab 32 may be made of various materials which will diffuse with the material of the conduit. Therefore, any material of which the conduit is made is suitable for use in the retaining tab 32, i.e., the examples set forth above, polypropylene or polyethylene. In molding a retaining tab 32 to the conduit 14 by utilizing material for the tab 32 which is compatible for bonding to the conduit 14, a chemical bond is formed between the retaining tab 32 and the exterior of the conduit 14. That is to say, the retaining tab 32 is intimately bonded to the conduit 14 thereby providing a strong, durable attachment. The temperature of the material forming the retaining tab 32 should preferably be somewhat higher than the softening temperature of the exterior of the conduit 16 so that during the molding of the retaining tab 32 to the conduit 16 there is some diffusion of the material of the tab 32 into the material of the conduit 16 and vice versa, thereby providing excellent fusion and hence an optimum bond between the retaining tab 32 and the conduit 14.

A portion 34 of the end fitting is then formed or molded about the retaining tab 32 so as to form a mechanical interlock between the end fitting 16 and the conduit 14 to prevent relative axial movement between the conduit 14 and the end fitting 16. The end fitting 16 may be formed about the retaining tab 32 by any one of various well known methods, however, the preferable method is to mold the end fitting 16 about the retaining tab 32 by placing the conduit 14 with the retaining tab 32 thereon within a mold and inserting a material of which the end fitting 16 is made into the mold so that the material flows about the retaining tab and hardens to form the end fitting 16. To increase the strength of the mechanical interlock between the end fitting 16 and the conduit 14, the retaining tab 32 may have a shoulder 36 extending thereabout. Alternatively, the retaining tab 32 may be corrugated, as shown at 38, so that portion 34 of the end fitting 16 may be formed about the retaining tab 32 so that the end fitting 16 is contiguous with the corrugations 38 to prevent relative axial movement between the end fitting 16 and the conduit 14.

Figure 4:
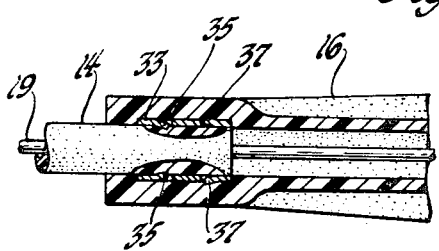
FIGURE 4 is an enlarged fragmentary view partly in cross section showing still another preferred embodiment of the instant invention.

Referring now to the embodiment of the invention illustrated in FIGURE 4, there is shown the end fitting 16, the conduit 14 and the wire-like rod 19 of the motion transmitting core element 18. Instead of utilizing a retaining tab of plastic material bonded to the conduit 14, as illustrated in FIGURES 1 through 3, there is illustrated in FIGURE 4 an alternative involving the utilization of the retaining tab 33, which is mechanically interlocked with the conduit 14 and mechanically interlocked with the end fitting 16. The retaining tab 33 may take any appropriate configuration and be made of any appropriate material, but metal is preferred. As illustrated, the retaining tab 33 is a substantially tubular element including a plurality of first teeth means 35 projecting inward from the retaining tab 33 and into the conduit 14 for mechanically interlocking the conduit and the retaining tab 33. As in the case of the retaining tabs illustrated in FIGURES 1 through 3, the retaining tab 33 may also be utilized with the flexible conduit 114 illustrated in FIGURES 5 through 7, which conduit includes an outer casing of organic polymeric material which the teeth means 35 will engage. The retaining tab 33 also includes a second teeth means 37 which project outward from the retaining tab 33 to engage fitting 16 for mechanically interlocking the fitting 16 and the retaining tab 33. The teeth means 35 and 37 are disposed at spaced intervals circumferentially about the retaining tab 33 and may be formed by cutting pointed flaps in the retaining tab 33 and bending the same inwardly and outwardly.

Various configurations of the retaining tab 33 for mechanically interlocking with the conduit 14 to the fitting 16 may be utilized. For example, retaining tab 33 need not employ the second teeth means 37 since the fitting 16 is molded about the retaining tab 33 such that the end of the retaining tab 33 abuts the fitting 16 to prevent the retaining tab 33 from being pulled out of the fitting 16. Clearly, therefore, the teeth means 35 through 37 are merely illustrative of various means for mechanically interlocking such a retaining tab to the conduit and fitting. In assembling the conduit 14 and fitting 16, as illustrated in FIGURE 4, the retaining tab 33 is disposed on the end of the conduit 14 and the fitting 16 is thereafter molded about the retaining tab 33 and the end of the conduit 14 so that a first mechanical interlock is formed between the conduit 14 and the retaining tab 33 and a second mechanical interlock is formed between the retaining tab 33 and the fitting 16 so that the conduit 14 is secured to the fitting 16. Various methods may be utilized to dispose the fitting 33 about the conduit 14. For example, the fitting 33 may be made of a flat or substantially flat piece of metal which is wrapped about the conduit 14. Normally, however, the end of the conduit 14 is pushed or inserted into the fitting 33. In so doing the teeth 35 are sufficiently resilient to move along the outer surface of the conduit 14, although the teeth 35 may make slight depressions in the exterior of the conduit 14. Once the conduit 14 has been inserted into the fitting 33 the teeth 35 bite into the casing of a conduit 14 and if a force is applied to urge the fitting 33 off the end of the conduit 14 the teeth 35, because of their disposition, are urged into greater biting engagement with the conduit. Also, the conduit 14 may be inserted into the fitting 33 to the position illustrated in FIGURE 4 and then the fitting 33 may be rotated relative to the conduit 14 so that the teeth 35 are disposed on a portion of the circumference of the conduit 14 which has in no manner been deformed by the teeth 35 as the fitting 33 is slid onto the conduit 14.

Referring now to the embodiment of the invention illustrated in FIGURES 5 through 9, the flexible conduit 114 comprises an inner tubular member 119 with a plurality of spaced filaments 120 helically wrapped about the inner tubular member 119 with a relatively long lead. The filaments 120 may be of any appropriate material, such as wire, fiberglass, or an organic polymeric material. The casing 121 is disposed about the filaments 120 and is preferably made of polypropylene or polyethylene.

The motion transmitting core element 118 is movably supported within the inner tubular member 119 of the conduit 114 and is adapted at one end to be attached to an element to be controlled (not shown) and is manually accessible at the other end for manual actuation. The conduit 118 may have an eyelet at one end similar to the eyelet 28 shown in FIGURE 1 and may have a knob attached at the other end similar to the knob 30 shown in FIGURE 1.

The end fittings 116 are adapted to be attached to a support structure by the holes 124 and 125 through which bolts, screws, or the like, may be inserted and threadedly attached to a support structure. The end fittings 116 enclose the ends of the conduit 114 and have a taper 126 in the end thereof which facilitates the insertion of the core element 118 into the conduit 114.

Like the fittings 16, the fittings 116 are preferably made of an acetal resin, Delrin, or nylon and as has been stated hereinbefore such materials are not compatible for bonding to the polypropylene or polyethylene casing 121 of the conduit 114. A retaining tab 132, similar to the retaining tab 32 of FIGURES 1 through 3, is bonded to the casing 121 so that a chemical bond is formed between the retaining tab 132 and the casing 121 in the same manner that the retaining tab 32 is bonded to the conduit 14.

As most clearly shown in FIGURE 7, the filaments 120 are spaced circumferentially about the inner tubular member 119. In the fabrication and during the use of such remote control assemblies it is necessary that the inner diameter of the tubular member 119 of the conduit 114, and the diameter of the bore 15 of the conduit 14, must be maintained substantially constant so that there is no binding or deformation of the conduit to interfere with the movement of the core elements 18 and 118 respectively. The filaments 120 of the conduit 114, besides carrying tension loads, provide hoop strength to resist radial compressive forces which may be applied to the conduit 114. If the filaments 120 are not spaced and abut each other, a significant degree of hoop strength is provided by such an arrangement of filaments. However, when the number of filaments 120 is reduced so that that filaments 120 are spaced, the hoop strength provided by the filaments 120 is reduced. Due to other considerations, such as weight, cost, and the like, it is frequently preferable that the conduit 114 have less than a full complement of filaments 120 so that the filaments 120 are spaced about the inner tubular member 119. And, as alluded to hereinbefore, problems have arisen in the past when end fittings have been attached to such a conduit in that excessive radial forces have been applied to the conduit to deform the conduit so that the conduit interferes with the movement of the motion transmitting core element.

The instant invention, therefore, is particularly suitable for use with the type conduit illustrated in FIGURES 5 through 7 in that the retaining tab, of the type shown at 32 in FIGURES 1 through 3 and the type shown at 132 in FIGURES 5 through 9, may be bonded to the conduit by diffusion with the exterior of the conduit to form a chemical bond without subjecting the conduit to excessive radial forces, or a retaining tab of the type shown at 33 in FIGURE 4 may be mechanically interlocked with the conduit, and an end fitting may be molded about such a retaining tab to form a secure mechanical interlock with the conduit. Of course, many materials may be utilized for the retaining tab 132 to provide a diffusion bond between the retaining tab 132 and the conduit. Therefore, any material of which the conduit is made may be utilized, i.e., polypropylene or polyethylene, the examples set forth above. The instant invention, therefore, provides a very satisfactory method of securing a fitting to a conduit to fabricate a remote control assembly.

The retaining tab 132, like the retaining tab 32, is made of material compatible for bonding to the casing 121, however, the retaining tab 132 has an external configuration which differs from the retaining tab illustrated in FIGURES 2 and 3. The retaining tab 132 has a plurality of spaced ribs 140 which extend axially thereealong. Each of the ribs 140 is an integral portion of the retaining tab 132 and has a substantially triangular-shaped cross section, as best illustrated in FIGURE 8. The retaining tab 132 also has a circumferentially disposed rib 142 extending thereabout so as to intersect the spaced ribs 140 and, as best illustrated in FIGURE 6, the rib 142 also is a portion integral with the retaining tab 132 and has a substantially triangular shaped cross section and is disposed substantially midway along the retaining tab 132. Valleys 141 are, therefore, disposed between adjacent ribs 140.

The ribs 140 and 142, besides providing a means of increasing the mechanical interlock between the fittings 16 and 116 and the conduits 14 and 114, also facilitate the molding of the fittings. Frequently, the diameter of the conduit is such that there is an undesirable amount of space between the conduit and the mold which forms that portion of the fitting about the retaining tab. In such an instance, if the external diameter of a substantially cylindrical retaining tab is too great such that the space between the retaining tab and the mold forming the fitting about the retaining tab is very small, the fluidized material forming the fitting, when injected into the mold, has a small space for flowing over the retaining tab and therefore has a tendency to harden before it flows to the end of and evenly about the retaining tab, thus providing a poor mechanical interlock between the fitting and the retaining tab. On the other hand, if the diameter of the retaining tab is too small so that there is ample space for the material forming the end fitting to flow without premature hardening, there is a minimal mechanical interlock between the retaining tab and the end fitting once the end fitting has been molded about the retaining tab. By utilizing a tab having a configuration like that of the retaining tab 132, such problems in molding the fitting about the retaining tab are alleviated. That is to say, when the fluidized material of which the fitting is made is injected into the mold, it is injected adjacent the rib 142 and has ample room to flow to the end of the retainer by flowing in the valleys 141 between adjacent ribs 140 so as to alleviate the tendency of the material to prematurely harden in small restricted areas. The material of which the fitting 116 is made, therefore, flows in the valleys 141 between adjacent ribs 140 and then flows laterally to fill the smaller spaces between the ribs 140 and the mold forming the fitting. The configuration of the retaining tab 132 thus facilitates the flow fo material of which the fitting is made so that the fitting totally encapsulates the retaining tab 132 and the retaining tab 132 has rib portions 140 having ample surface area on the ends thereof to form a very satisfactory mechanical interlock between the fitting and the retaining tab 132.

The guide for the remote control assembly may, therefore, be fabricated with the conduit made of material incompatible for bonding to the material of the end fitting by bonding a retaining tab of material compatible for such bonding to the exterior of the conduit, or mechanically interlocking a retaining tab to the exterior of the conduit, and thereafter molding a portion of the end fitting about the retainer tab so as to create a mechanical interlock between the conduit and the end fitting.

It will be readily clear to those of ordinary skill in the art that various configurations of the retaining tab may be employed within the spirit of the invention, which is to solve the problem of connecting two materials, which are incompatible for bonding together. It is also to be understood that the elements of the embodiments illustrated may be associated together in various combinations other than those specifically shown.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A remote control assembly comprising: a flexible conduit including, an inner tubular member, a plurality of spaced filaments helically wrapped about said inner tubular member with a relatively long lead, a casing disposed about said filaments; a metal retaining tab secured to said casing of said conduit by a mechanical interlock; a fitting of material incompatible for bonding to said casing being molded at least partially about said retaining tab; and a core element movably supported in said inner tubular member of said conduit.

2. A remote control assembly comprising; a flexible conduit including, an inner tubular member of organic polymeric material, a plurality of filaments helically wrapped about said inner tubular member with a relatively long lead; a casing of organic polymeric material disposed about said filaments; a retaining tab disposed about said conduit and including, first teeth means projecting inward from said retaining tab into said casing of said conduit for mechanically interlocking said conduit and said retaining tab, second teeth means projecting outward from said retaining tab; a fitting of organic polymeric material disposed about said second teeth means and said retaining tab for mechanically interlocking said fitting and said retaining tab thereby mechanically securing said fitting to said conduit; and a core element movably supported within said conduit and said fitting.

3. A method of making a remote control assembly of the type having a movable core element and a flexible conduit secured to a fitting of material incompatible for bonding to said conduit, said method comprising the steps of; securing a retaining tab to said conduit by a mechanical interlock, and molding a portion of said fitting about said retaining tab.

4. A method of making a remote control assembly of the type having a movable core element and a flexible conduit secured to a fitting which is of material incompatible for bonding to the conduit, said method comprising the steps of; bonding a retaining tab having a corrugated surface to said conduit, and molding a portion of said end fitting contiguous with said corrugated surface of said retaining tab whereby said fitting is mechanically secured to said retaining tab.

5. A method of making a remote control assembly of the type having a movable core element and a flexible conduit secured to a fitting which is of material incompatible for bonding to the conduit, said method comprising the steps of; bonding a retaining tab to said conduit which tab has spaced axially extending ribs thereabout with a circumferentially disposed rib intersecting said spaced ribs, and molding a portion of said fitting about said tab.

6. A remote control assembly comprising; a flexible conduit having an outer surface of organic polymeric material, a fitting of organic polymeric material which is incompatible for bonding diffusion with the organic polymeric material of said conduit, said fitting being adapted to be attached a support structure, a retaining tab secured to said conduit, said fitting being disposed in mechanical interlocking engagement with said retaining tab so that said fitting is secured to said conduit through said retaining tab, and a core element movably supported within said conduit and said fitting, said retaining tab having a plurality of integral portions with substantially triangular shaped cross-sections spaced thereabout and extending axially therealong, said retaining tab having an integral portion with a substantially triangular shaped cross-section extending circumferentially thereabout so as to intersect said first mentioned portions substantially midway along said retaining tab.

7. A remote control assembly comprising; a flexible conduit having an outer surface of organic polymeric material, a fitting of organic polymeric material which is incompatible for bonding diffusion with the organic polymeric material of said conduit, said fitting being adapted to be attached a support structure, a retaining tab secured to said conduit, said fitting being disposed in mechanical interlocking engagement with said retaining tab so that said fitting is secured to said conduit through said retaining tab, and a core element movably supported within said conduit and said fitting, said retaining tab including first means projecting inwardly from said retaining tab and into said conduit for mechanically interlocking said conduit and said retaining tab, and second means projecting outwardly from said retaining tab and into mechanical interlocking engagement with said fitting whereby said fitting is mechanically secured to said conduit.

8. A remote control assembly comprising; a flexible conduit having an outer surface of organic polymeric material, a fitting of organic polymeric material which is incompatible for bonding diffusion with the organic polymeric material of said conduit, said fitting being adapted to be attached a support structure, a retaining tab secured to said conduit, said fitting being disposed in mechanical interlocking engagement with said retaining tab so that said fitting is secured to said conduit through said retaining tab, and a core element movably supported within said conduit and said fitting, said retaining tab being made of organic polymeric material and being bonded to said conduit so that said outer surface thereof and said retaining tab are diffused together, said retaining tab having a plurality of spaced ribs thereabout and extending axially therealong and a circumferentially disposed rib extending thereabout so as to intersect said spaced ribs.

9. A remote control assembly comprising; a flexible conduit having an outer surface of organic polymeric material, a fitting or organic polymeric material which is incompatible for bonding diffusion with the organic polymeric material of said conduit, said fitting being adapted to be attached a support structure, a retaining tab secured to said conduit, said fitting being disposed in mechanical interlocking engagement with said retaining tab so that said fitting is secured to said conduit through said retaining tab, and a core element movably supported within said conduit and said fitting, said retaining tab being made of organic polymeric material and being bonded to said conduit so that outer surface thereof and the said retaining tab are diffused together, said conduit including an inner tubular member, a plurality of filaments helically wrapped about said inner tubular member with a long lead, and a casing of organic polymeric material disposed about said filaments, said retaining tab and said casing being made of an organic polymeric material of a group including polypropylene and polyethylene, said fitting being made of an organic polymeric material of a group including acetal resin and nylon.

References Cited

UNITED STATES PATENTS

| | | | |
|---|---|---|---|
| 3,094,582 | 6/1963 | Jacobson | 74—501 X |
| 3,132,412 | 5/1964 | Kreissig | 264—274 X |
| 3,263,520 | 8/1966 | Tschanz | 74—501 |
| 3,263,948 | 8/1966 | Conrad | 74—501 |

MILTON KAUFMAN, *Primary Examiner.*